June 3, 1947.                J. H. SCOTT                2,421,581
DRAFTING MACHINE ROLLING CONTACT DISTANCE CALCULATOR
Filed June 13, 1945                2 Sheets-Sheet 1

INVENTOR.
JOHN H. SCOTT
BY F. Ledermann
ATTORNEY

June 3, 1947.    J. H. SCOTT    2,421,581
DRAFTING MACHINE ROLLING CONTACT DISTANCE CALCULATOR
Filed June 13, 1945    2 Sheets-Sheet 2

INVENTOR.
JOHN H. SCOTT
BY
F. Ledermann
ATTORNEY

Patented June 3, 1947

2,421,581

UNITED STATES PATENT OFFICE 2,421,581

DRAFTING MACHINE ROLLING CONTACT DISTANCE CALCULATOR

John H. Scott, Houston, Tex.

Application June 13, 1945, Serial No. 599,136

4 Claims. (Cl. 33—141)

1

This invention relates to drafting machines, and aims to provide a drafting machine calculator adapted to register the distance that the drafting machine is moved on the drafting board, either vertically, horizontally, or diagonally. The calculator may be constructed into a drafting machine or it may be constructed separately and attached to the machine. The calculator may be so graduated that it enables the draftsman or operator to read instantly the distance the machine has been moved, even down to very small or minute distances, thereby eliminating the need for other measuring means.

The above and other objects will become apparent in the description below, wherein characters of reference refer to like-numbered parts in the accompanying drawings. It is to be noted that the drawings are intended for the purpose of illustration only, and that it is neither desired nor intended to limit the invention in any manner to the specific details of construction shown excepting insofar as they may be deemed essential to the invention.

Referring briefly to the drawings, Fig. 1 is a plan view of the calculator.

Figure 1:
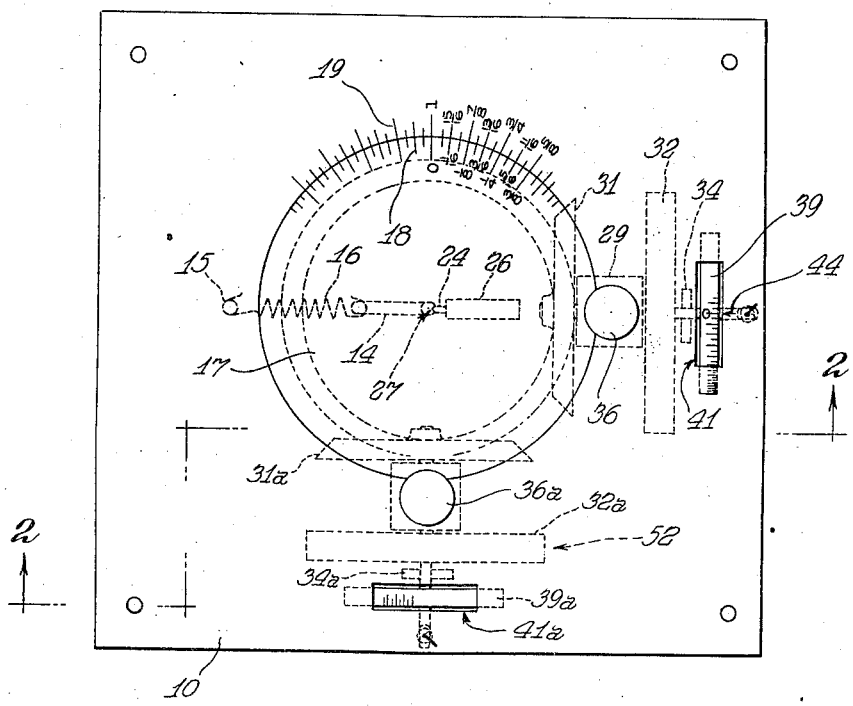

Referring in detail to the drawings, the numeral 10 indicates the upper and the numeral 11 the lower of a pair of spaced parallel plates held together by posts 12. A crank shaft 13 having the crank 14 forming part thereof, is rotatably mounted upright between the plates 10 and 11 and has its extremities projecting beyond both plates. A staff 15 secured between the plates has one end of a spring 16 anchored thereon, the other end of this spring being loosely secured to the crank 14. A somewhat conical, disc-like dial 17 is secured to the upper end of the shaft 13 and is provided with peripheral graduations 18; the upper plate 10 surrounding the dial 17 is likewise provided with graduations 19. Spaced collars 20 on the shaft 13 on either side of the lower plate 11 permit of limited vertical movement of the shaft 13. A spring finger 21 secured against the plate 11 has its free extremity normally urged against the hub 22 of a horizontal bevel gear 23 fixed on the lower end of the shaft 13. A pin 24 slidably mounted in a barrel 25 supported under the plate 10 on a radius of the shaft 13, is normally urged

2 outward from the barrel by a spring 26. The spring 16 obviously normally urges the shaft 13 into the position shown in Figs. 1 and 2; in alignment with the pin 24 and on the diametrically opposite side of the shaft (to the crank 14) the shaft has a rounded indentation or notch 27. The end of the pin 24 is complementarily rounded and obviously normally registers in the notch 27, thereby providing a readily releasable friction lock to maintain the shaft 13 in the said normal position. The graduations on the dial 17 may be so marked as to indicate the zero position or reading on the dial with the shaft 13 in the said normal position.

At one side of the dial a pin 28 is slidably mounted in the plates 10 and 11 and near its lower end is enlarged to provide a bearing support 29 through which a shaft 30 rotatably extends. On one end of the shaft 30 a bevel gear 31 is fixed and is adapted to be engaged, in the manner to be described, with the bevel gear 23. On the other end of the shaft 30 a friction or traction wheel 32 is fixed; the shaft extends beyond the wheel 32 and has a pinion 33 on its extremity. An upright wall or guide 34 is supported between the plates 10 and 11 and is provided with a vertical slot 35 through which the pinioned end of the shaft 30 passes. A button 36 is provided on the upper extremity of the pin 28, and a coiled spring 37 normally urges the button, and hence the pin 28, gear 31 and wheel 32 upward so that normally the gear 31 is out of engagement (not shown) with the gear 23 and the wheel 32 is raised above the board, not shown.

Figure 2:
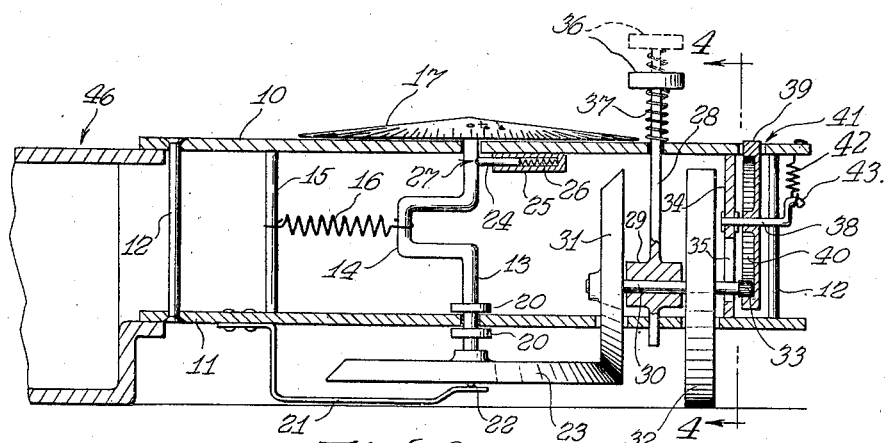
Fig. 2 is a cross-sectional view taken on the line 2—2 of Fig. 1.

A stub shaft 38 is rotatably mounted in the wall 34 and has rigid intermediate its length thereon a graduated wheel 39 provided with internal annular teeth 40 in which the pinion 33 registers when the button 36 is in its depressed position shown in Fig. 2. The plate 10 is slotted at 41, and through the slot the upper portion of the wheel 39 projects. The free end of the shaft 38 is deformed into a hook, and a coiled spring 42 secured to the plate 10 and to the hook 43 normally maintains the hook 43 upright. The zero graduation on the wheel 39 is so placed that in the said normal position of the wheel the zero graduation is indicated against the index arrow 44 on the plate adjacent the slot 41.

Figure 3:
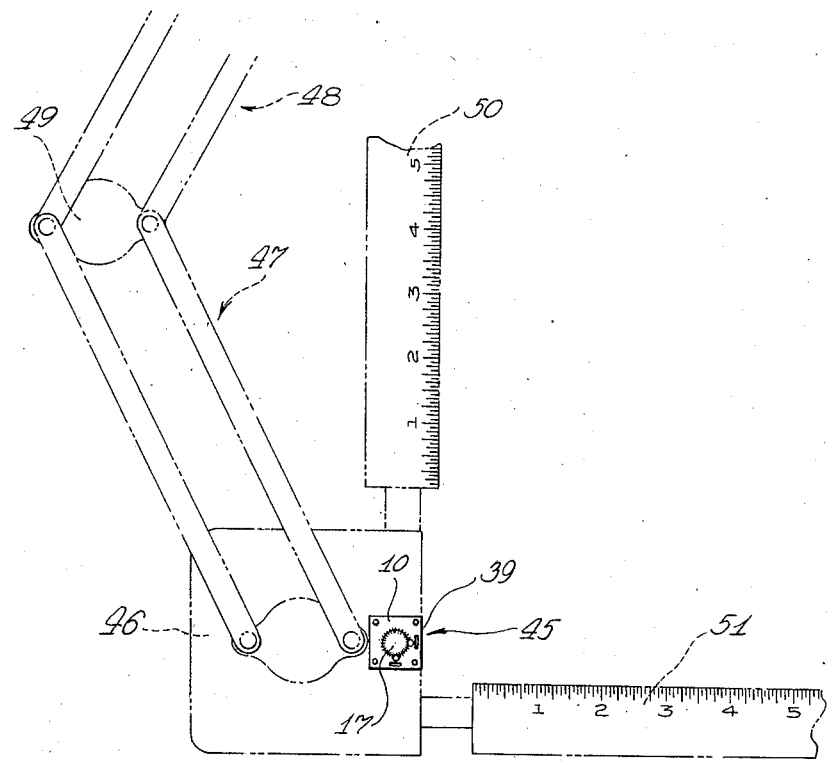
Fig. 3 is an enlarged fragmentary and partly phantom or outline view of a drafting machine, showing the calculator mounted thereon.
Figure 4:
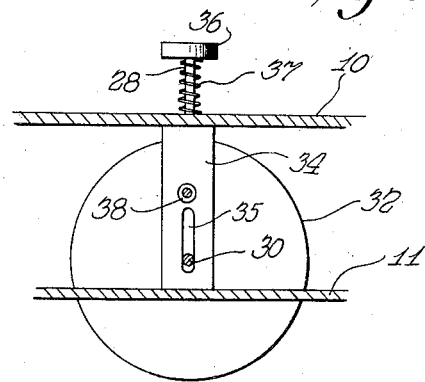
Fig. 4 is a cross-sectional view taken on the line 4—4 of Fig. 2.

In Fig. 3 one type of drafting machine is shown fragmentarily, and it comprises the base member 46 having the articulated arms 47 and 48 extending therefrom, the latter being pivoted to the support 49. The two straight edges 50 and 51 extend from the member 46 at right angles thereto. The calculator, shown at 45, is illustrated mounted in and forming part of the member 46.

It is apparent that when the vertical distance that the machine, or the member 46, is moved on the drawing board is to be measured, the machine is moved along that distance with the button 36 depressed to engage bevel gear 31 with bevel gear 23 and to engage simultaneously pinion 33 with gear teeth 40 of the wheel 39. Frictional engagement of the wheel 32 against the board, or paper, will cause, during movement of the machine, rotation of the shaft 13 and of the dial 17, and with proper graduations on the dial and the plate 10 surrounding the same the distance may be readily measured thereon. For measurement of the distance moved in a horizontal direction, the mechanism described is identically repeated in a position at right angles to that described, shown at 52, excepting for the staff 15, spring 16, and crank shaft 13 and its directly associated parts including the dial 17, since all of these are common to both calculator mechanisms, and the vertical bevel gears of both are positioned movably above the horizontal bevel gear 23 ready for engagement therewith selectively. Therefore similar parts of the mechanism 52 are indicated by the same reference numeral followed by the letter "a." Fine readings may be had on the dial 17, and coarser readings on the wheel 39, as is obvious. The spring 21 serves as a shock absorber to prevent straining or missing of the mechanism when passing over uneven or rough places on the paper or board. To measure distances of diagonal movement of the machine, the latter may be swung into position until either of the calculator wheels 32 or 32a is in line with the movement.

I claim:

1. A device of the class described comprising a pair of spaced plates having means for securing the plates together in spaced parallel relationship, a crank shaft vertically rotatably mounted between said plates and having its extremities projecting through the plates, the upper extremity of said shaft having a dial thereon, the lower extremity of said shaft having a horizontal bevel gear thereon, a pin slidably projecting through said plates and having an enlarged portion between the plates, said portion having a horizontal shaft extending rotatably therethrough, said horizontal shaft having a vertical bevel gear on one end thereof positioned above said horizontal gear and adapted to be engaged therewith, the other end of said horizontal shaft having a friction wheel rigid thereon of greater diameter than said vertical bevel gear, resilient means normally urging said pin upward to maintain said vertical gear out of engagement with said horizontal gear and to maintain said wheel elevated above the plane of the surface on which the device is being used, said pin being depressible to interengage said gears and to bring said wheel into contact with said surface.

2. The device set forth in claim 1, said dial having a zero position, and means for maintaining said dial in said zero position when said pin is undepressed.

3. The device set forth in claim 1, a second wheel rotatably mounted adjacent said first wheel and having graduations thereon, said second wheel having internal annular teeth, a pinion on said horizontal shaft normally positioned above and adapted to be lowered to engage said teeth upon depression of said pin.

4. The device set forth in claim 1, said dial having a zero position, means normally urging said dial into said zero position, and means for releasably maintaining said dial in said zero position.

JOHN H. SCOTT.